United States Patent
Duchin et al.

(10) Patent No.: US 10,142,308 B1
(45) Date of Patent: Nov. 27, 2018

(54) USER AUTHENTICATION

(71) Applicant: EMC Corporation, Hopkinton, MA (US)

(72) Inventors: Zohar Duchin, Herzliya (IL); Alex Zaslavsky, Petah Tikva (IL); Ika Bar-Menachem, Herzelia (IL); Shachar Israeli, Hod Hasharon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/319,175

(22) Filed: Jun. 30, 2014

(51) Int. Cl.
*H04L 29/06* (2006.01)

(52) U.S. Cl.
CPC .................. *H04L 63/08* (2013.01)

(58) Field of Classification Search
CPC .......... G06F 21/00; G06F 21/30; G06F 21/31; G06F 21/316; G06F 21/36; G06F 21/42; G06F 21/44; H04L 63/00; H04L 63/08; H04L 63/083; H04L 63/0861; H04L 63/0876; H04L 63/10; H04L 63/102; H04W 12/00; H04W 12/06; H04W 12/08; H04W 12/12

See application file for complete search history.

(56) References Cited

U.S. PATENT DOCUMENTS

| | | | | |
|---|---|---|---|---|
| 2003/0229782 A1* | 12/2003 | Bible, Jr. | ................ | G06F 21/31 713/155 |
| 2005/0268107 A1* | 12/2005 | Harris | ..................... | G06F 21/31 713/182 |
| 2006/0029261 A1* | 2/2006 | Hoffman | ................ | G06Q 20/12 382/115 |
| 2006/0101114 A1* | 5/2006 | Sandhu | ............... | G06F 17/3089 709/203 |
| 2006/0230265 A1* | 10/2006 | Krishna | .................. | H04L 63/08 713/158 |
| 2006/0282660 A1* | 12/2006 | Varghese | ............. | G06Q 20/341 713/155 |
| 2007/0236330 A1* | 10/2007 | Cho | ....................... | G06F 21/305 340/5.54 |
| 2010/0192209 A1* | 7/2010 | Steeves | .................. | G06F 21/316 726/7 |
| 2010/0325040 A1* | 12/2010 | Etchegoyen | ........... | G06F 21/31 705/39 |
| 2011/0016534 A1* | 1/2011 | Jakobsson | ............. | G06F 21/316 726/28 |
| 2012/0185916 A1* | 7/2012 | Chae | ...................... | G06F 21/316 726/2 |
| 2013/0042327 A1* | 2/2013 | Chow | .................. | G06F 21/316 726/28 |
| 2013/0191908 A1* | 7/2013 | Klein | ...................... | G06F 21/36 726/18 |
| 2013/0194070 A1* | 8/2013 | Vemireddy | ............. | G06F 21/36 340/5.81 |
| 2013/0343616 A1* | 12/2013 | Forero | ............... | G06K 9/00335 382/115 |

(Continued)

*Primary Examiner* — Jung W Kim
*Assistant Examiner* — Adrian Stoica
(74) *Attorney, Agent, or Firm* — Krishnendu Gupta

(57) ABSTRACT

There is disclosed a technique for use in authentication. In one embodiment, the technique comprises receiving behavioral information associated with a user. The technique also comprises performing an analysis based on the behavioral information. The technique further comprises determining whether to authenticate the user based on the analysis.

9 Claims, 6 Drawing Sheets

(56) References Cited

U.S. PATENT DOCUMENTS

2013/0347100 A1* 12/2013 Tsukamoto ........... H04L 9/3226
726/19
2014/0280592 A1* 9/2014 Zafarani ................. H04L 67/22
709/204

* cited by examiner

USER AUTHENTICATION

TECHNICAL FIELD

The present invention relates generally to the field of authentication. More specifically, the invention relates to a method, an apparatus, and a computer program product for use in user authentication.

BACKGROUND OF THE INVENTION

In today's high-tech, fast-paced, hyper-connected world, people are spending more and more time on the internet to complete more of their daily activities such as online banking and shopping. The convenience afforded by the access and availability of the online world is, however, not without drawbacks. This increased access has brought with it an unparalleled growth in online fraudulent activity.

Reports about identity takeover, filled with phrases like Trojan, Man in the Middle, Man in the Browser, and Phishing, are increasingly in the news. These emerging threats have triggered a growing awareness by service providers and customers alike. These threats are serious and need addressing.

One of the most common ways to fight fraudulent activities is to bind a specific computing device (e.g. laptop, smartphone, etc.) to a specific user. This can be done, for example, by device fingerprinting. However, the current growth in mobile presents a new challenge for device fingerprinting because device identification is much harder due to low uniqueness of browser related information (e.g. most iPhones use the same browser, same screen resolution, etc.). Also, it may be unreliable to rely on smartphones unique identifiers such as IMEI, MEID, MAC address, etc., as both iOS and Android platforms tend to obfuscate or deny the access to them in an effort to address user privacy issues.

Further, it may be unpredictable to rely on device tagging using cookies as these are relatively easy to steal. Currently, when a user is being authenticated a cookie is saved in the device that is used. Usually, the cookie contains two pieces of information. The first piece of information comprises a time stamp that indicates when the cookie was created and is used to verify there is no mismatch in the time of creation that is stored in a remote host. The second piece of information comprises a unique identifier key that is used to match its value with the one stored in a remote host. This approach has the disadvantage that access is approved once the key matches what is stored in the host service and the last log-in time is consistent. The approach is, therefore, vulnerable to "over the air theft" meaning that a cybercriminal can get access to an account by copying the cookie to his device.

There is, therefore, a need for further approaches for use in authentication.

SUMMARY OF THE INVENTION

There is disclosed a method, comprising: receiving behavioural information associated with a user; based on the behavioural information, performing an analysis; and based on the analysis, determining whether to authenticate the user.

There is also disclosed an apparatus, comprising: at least one processing device, said at least one processing device comprising a processor coupled to a memory; wherein the apparatus is configured to: receive behavioural information associated with a user; based on the behavioural information, perform an analysis; and based on the analysis, determine whether to authenticate the user.

There is further disclosed a computer program product having a non-transitory computer-readable medium storing instructions, the instructions, when carried out by one or more processors, causing the one or more processors to perform a method of: receiving behavioural information associated with a user; based on the behavioural information, performing an analysis; and based on the analysis, determining whether to authenticate the user.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

Figure 1:
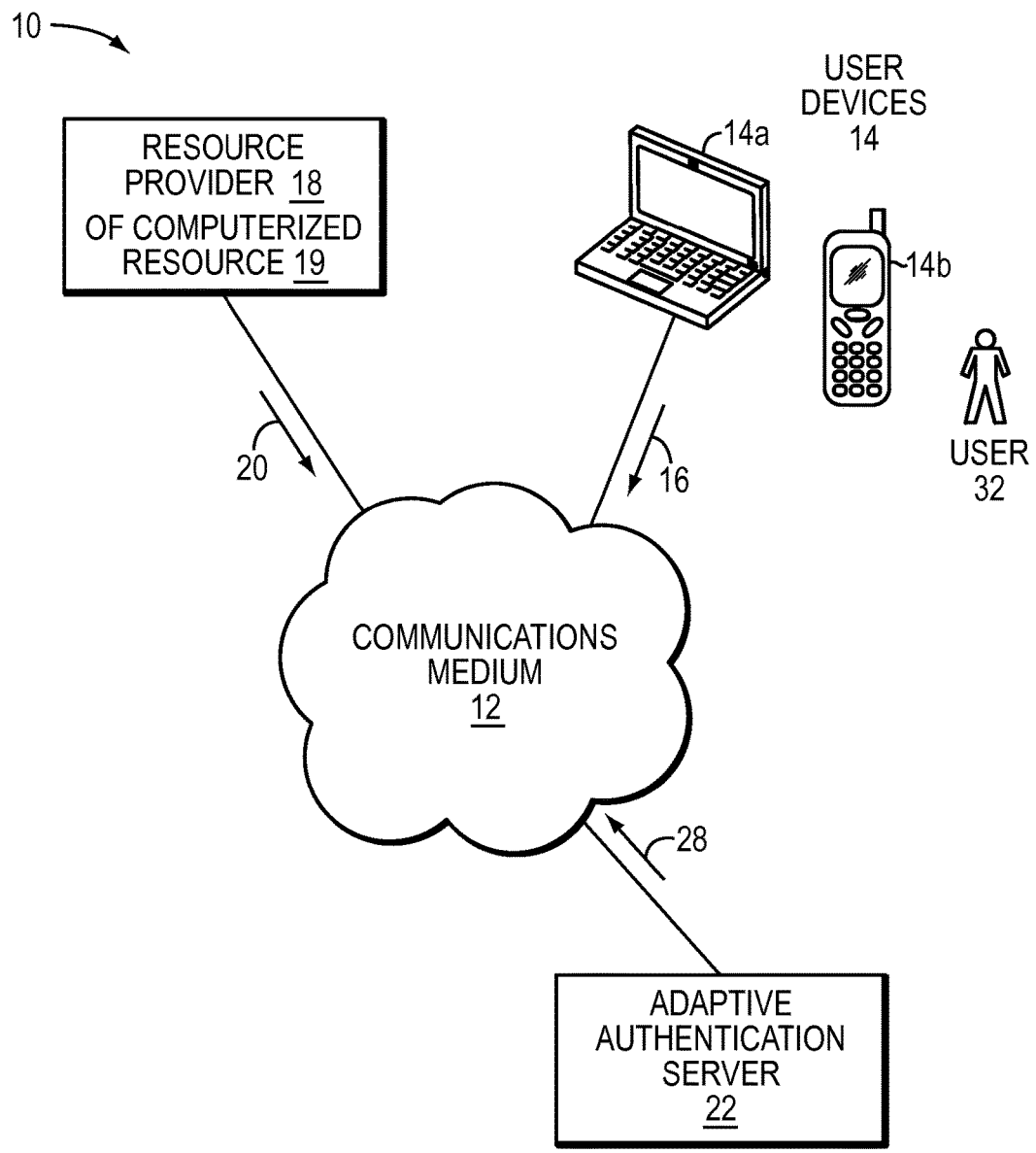
FIG. 1 is a schematic diagram illustrating an electronic environment for carrying out a technique.

Referring to FIG. 1, there is illustrated an electronic environment 10 for carrying out a technique. Electronic environment 10 includes communications medium 12, user devices 14, resource provider 18, and adaptive authentication server 22.

Communication medium 12 provides network connections between user devices 14, resource provider 18, and adaptive authentication server 22. Communications medium 12 may implement a variety of protocols such as TCP/IP, UDP, ATM, Ethernet, Fibre Channel, combinations thereof, and the like. Furthermore, communications media 12 may include various components (e.g., cables, switches/routers, gateways/bridges, NAS/SAN appliances/nodes, interfaces, etc.). Moreover, the communications medium 12 are capable of having a variety of topologies (e.g., queue manager-and-spoke, ring, backbone, multi drop, point to-point, irregular, combinations thereof, and so on).

User devices 14 include smartphones, personal digital assistants, laptop computers, tablet computers, and the like, constructed and arranged to submit request 16 to resource provider 18 via communications medium 12.

Resource provider 18 is constructed and arranged to receive request 16 from user device 14 via communications medium 12. Resource provider 18 is constructed and arranged to send request 20 to adaptive authentication server 22 via communications medium 12. Resource provider 18 is further constructed and arranged to receive adaptive authentication result 28 from adaptive authentication server 22.

Adaptive authentication server 22 is constructed and arranged to receive request 20 from resource provider 18 over communications medium 12. Adaptive authentication server 22 is also constructed and arranged to perform adaptive authentication operations. Adaptive authentication server 22 is further constructed and arranged to send adaptive authentication results 28 to resource provider 18.

During operation, user 32 may send request 16 to the resource provider 18 requesting access to a computerized resource 19. For example, the user 32 may send the request 16 using a smartphone 14. The request 16 may include identification information entered by the user 32 as well as other additional information as will be described further below. Upon receiving the request 16, the resource provider 18 may send request 20 through the communications medium 12 to the adaptive authentication server 22 directing the adaptive authentication server 22 to perform an adaptive authentication operation.

Figure 2:
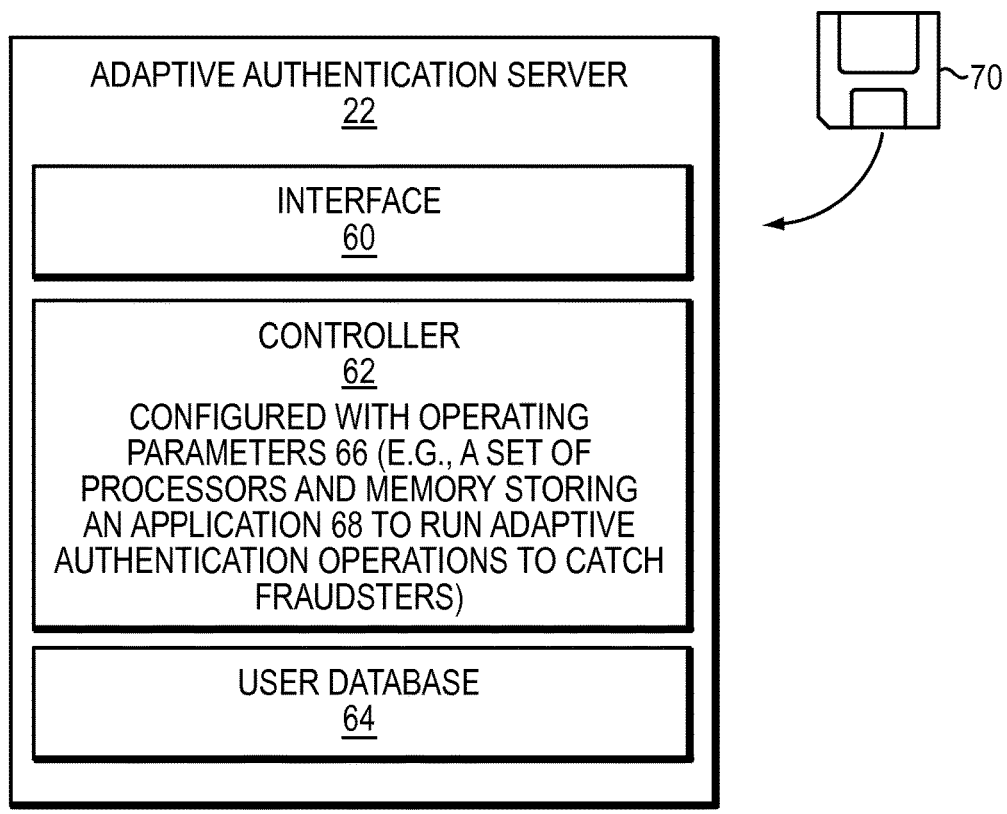
FIG. 2 is a schematic diagram illustrating an adaptive authentication server within the electronic environment of FIG. 1.

Next, in response to receiving the request 20, the adaptive authentication server 22 may perform the adaptive authentication operation by obtaining information from database 64 (see FIG. 2). It should be understood that the database 64 may contain a set of entries with each entry being associated with a previous transaction. Adaptive authentication server 22 may access database 64 and locate relevant entries of previous user transactions with the assistance of the identification information. Adaptive authentication server 22 may then read the values of attributes associated with the previous user transactions to enable an analysis between the previous transactions and the current transaction 16 which in turn enables generation of authentication result 28.

After generating authentication result 28, adaptive authentication server 22 may send authentication result 28 to resource provider 18 over communications medium 12. Based on authentication result 28, resource provider 18 may process request 16 or cancel request 16.

It should be understood that in this embodiment the resource provider 18 can provide each user device 14 with access to one or more computerized resources 19 following successful user authentication. An example of a suitable resource provider 18 is a data storage array which provides secure access to files, directories, volumes, LUNs, etc. Another example of a suitable resource provider 18 is a web server which provides secure access to various web pages. Yet another example of a suitable resource provider 18 is a server which provides secure user account and/or transactional access such as that for an online banking site, an online store, an online gaming site, and so on. Other types of resource providers are suitable for use as well.

Referring to FIG. 2, there is illustrated certain details of the adaptive authentication server 22. The adaptive authentication server 22 includes interface 60, controller 62, and user database 64. The interface 60 enables the adaptive authentication server 22 to receive input and provide output. The user database 64 is constructed and arranged to store information in connection with users 32. The controller 62 is constructed and arranged to access the information in the user database 64 and perform adaptive authentication operations to catch fraudsters.

During operation, the controller 62 may utilize certain operating parameters 66 for effective risk analysis. For example, the controller 62 may generate a user attribute risk score (i.e., a result between 0 and 1000) indicating an amount of risk based on a comparison between earlier stored user attributes and currently received user attributes. In this situation, the operating parameters 66 may include a predefined user attribute threshold so that a user attribute risk score above the user attribute threshold indicates a likely fraudster situation while a user attribute risk score below the user attribute threshold indicates an unlikely fraudster situation. In some arrangements, the user attribute risk score is an aggregation of individual weight risk analysis results from comparisons of individual attribute factors (e.g., user device attributes, etc.).

Similarly, the controller 62 may generate a user behavior risk score (i.e., a result between 0 and 1000, but which is a different score than the user attribute risk score) indicating an amount of risk based on a comparison between earlier stored user behavior information (e.g., behavioral biometrics, etc.) and recently received user behavior information. In this situation, the operating parameters 66 may include a predefined user behavior threshold so that a user behavior risk score above the user behavior threshold indicates a likely fraudster situation while a user behavior risk score below the user behavior threshold indicates an unlikely fraudster situation. In some arrangements, the user behavior risk score is an aggregation of individual weight risk analysis results from comparisons of individual behavior factors (e.g., keystrokes, etc.).

In some arrangements, the controller 62 is implemented using a set of processors (e.g., processing boards, a microprocessor, etc.) and memory which stores, among other things, a specialized adaptive authentication application 68. In such arrangements, the controller 62 forms a specialized circuit when executing the specialized adaptive authentication application 68.

It should be understood that the specialized adaptive authentication application is capable of being delivered to and installed on the adaptive authentication server 22 from a computer program product 70 (illustrated generally by a diskette icon). Such a computer program product 70 includes a non-transitory computer readable storage medium which stores, in a non-volatile manner, instructions for performing the adaptive authentication operations. Examples of suitable computer readable storage media include CD-ROM, magnetic disk or tape cartridges, flash memory, disk memory, and the like. In addition to installing the adaptive authentication application locally, it should be understood that such specialized software may be made available as a service via the Internet (e.g., SaaS).

Figure 3:
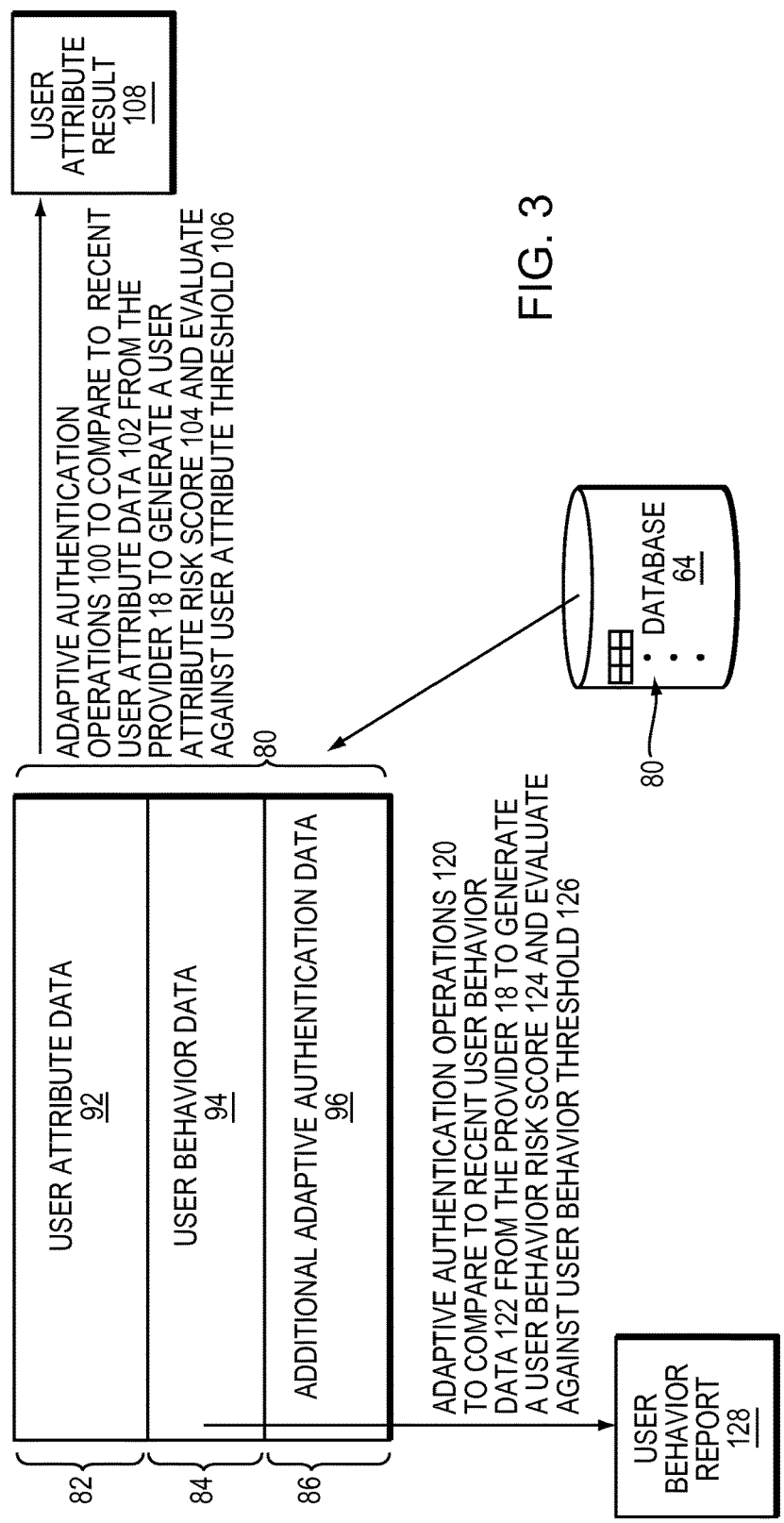
FIG. 3 is a block diagram showing particular aspects of a user database and how user information stored in the user database is utilized by the adaptive authentication server of FIG. 2.

Referring to FIG. 3, there is illustrated the user database 64 and how the information stored in the user database 64 is utilized by the adaptive authentication server 22 of FIG. 2. As shown, the user database 64 includes user entries 80 which define various features of a user 32. It should be understood that the adaptive operation of the adaptive authentication server 22 may be ongoing in that the user database 64 initially stores values based on initial activity of the user 32 (i.e., based on initial transmissions or requests). As transmissions continue over time (e.g., days, months, years, etc.), the user database 64 may accumulate more data and thus better define certain user attributes and behaviors of the user 32.

Each user entry 80 includes, for a user 32, a set of user attribute fields 82, a set of behavior data fields 84, and additional adaptive authentication fields 86. The user attribute fields 82 are constructed and arranged to contain user attribute data 92 of that user 32 (e.g., user device attributes, etc.). The user behavior fields 84 are constructed and arranged to contain user behavior data 94 of that user 32 (e.g., behavioral biometrics, etc.). The additional adaptive authentication fields 86 are constructed and arranged to contain additional information. For example, the additional information may comprise data that is appropriate for fraud intelligence (e.g., a note indicating the user has user attributes/behavior which is highly correlated to hacking), case management (e.g., history of previous hacking), and so on.

As shown, the adaptive authentication server 22 may perform operations 100 to determine whether to approve or deny user access in response to a current user login attempt. Here, the controller 62 of the adaptive authentication server 22 may compare the user attribute data 92 to recent user attribute data 102 to generate a user attribute risk score 104 which is evaluated against a predefined user attribute threshold 106 (e.g., a tunable number between 0 and 1000). If the user attribute risk score 104 is lower than the user attribute threshold 106, the controller 62 may give a user attribute result 108 a first access value to grant the user 32 access. However, if the user attribute risk score 104 is higher than the user attribute threshold 106, the controller 62 may give the user attribute result 108 a second access value to deny the user 32 access.

Similarly, the adaptive authentication server 22 may perform operations 120 to determine possible fraudster situations. In this situation, the controller 62 of the adaptive authentication server 22 may compare the user behavior data 94 to recent user behavior data 122 to generate a user behavior risk score 124 which is evaluated against a predefined user behavior threshold 126 (e.g., a tunable number between 0 and 1000). If the user behavior risk score 124 is lower than the user behavior threshold 126, the controller 62 may give a user behavior report 128 a first behavior value indicating that a possible fraudster situation is unlikely. However, if the user behavior risk score 124 is higher than the user behavior threshold 126, the controller 62 may give the user behavior report 128 a second behavior value indicating that a possible fraudster situation is likely.

Likewise, it should be understood that additional evaluations can be made to the data that is received. Along these lines, intermediate risk results may be weighted and combined with other intermediate risk results to determine an overall risk score on a sliding continuous scale (e.g., between 0 and 1000). The particular position along the sliding continuous scale provides an indication of the risk associated with user 32, i.e., the likelihood that a fraudster has compromised the user's account.

Figure 4A:
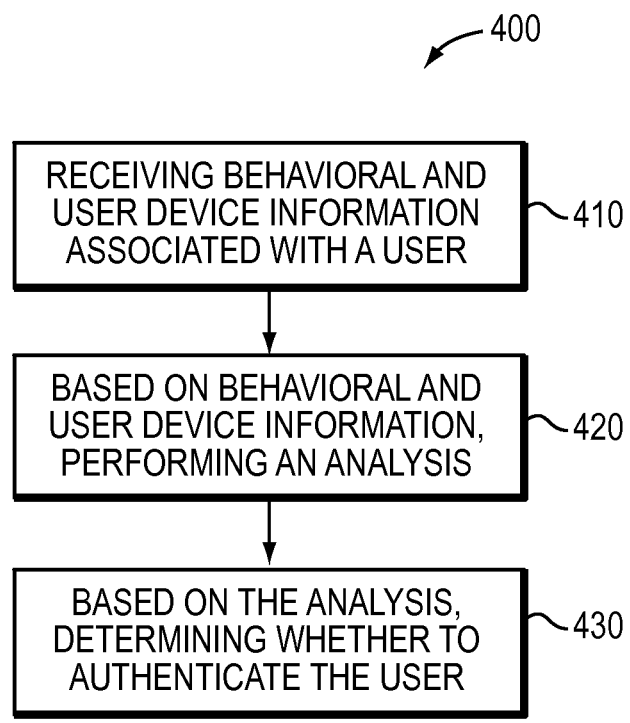
FIG. 4A is a flow chart illustrating a method of carrying out the technique within the electronic environment of FIG. 1.

Referring to FIG. 4A, there is illustrated a flow chart showing a method of carrying out the technique within the electronic environment shown in FIG. 1. In the flow diagram, the operations are summarized in individual blocks. The operations may be performed in hardware, or as processor-executable instructions that may be executed by a processor. Furthermore, the method 400 may, but need not necessarily, be implemented in the environment of FIG. 1.

At step 410, the method comprises receiving behavioural and user device information associated with a user. The behavioural information may comprise user interaction information in connection with user device. For example, the behavioural information or behavioural biometrics may relate to at least one of keystroke time latencies, tapping vibrations, rotations, gesture location, speed, motion, and pressure. The user device information may comprise device attributes in connection with user device. For example, the device attributes may relate to operating systems, plugin versions, apps, fonts, and browser information.

At step 420, the method comprises performing an analysis based on the behavioural and user device information. For example, the method may comprise obtaining expected behavioural and user device information associated with previous transactions (e.g., see FIG. 3 above). The method may in turn analyse the received behavioural and user device information and the obtained expected information.

At step 430, the method comprises determining whether to authenticate the user based on the analysis. It should be understood that determining whether to authenticate the user may comprise determining a numerical risk score which quantitatively identifies a level of risk. It should also be understood that determining whether to authenticate the user may further comprise comparing the risk score against a threshold in order to ascertain whether to grant or deny access.

In one use embodiment, the behavioural and user device information may be collected at login. The collected information is then forwarded to the authentication server (possibly via resource provider). Upon receiving the information, the authentication server may compare the received information to expected information as contained within the database. If the comparison is high then an appropriate risk score may be determined. If the comparison is low then likewise an appropriate risk score may be determined. The risk score may then be compared to a threshold in order to ascertain whether to grant or deny authentication. The comparison with the threshold may occur at either the authentication server or the resource provider.

In a further use embodiment, it should be appreciated that behavioural and user device information may be collected during first login. For example, the user behavioral and user device information may be collected in the background at first login to a resource provider (e.g., web server). A file (e.g., cookie) may then be created at login comprising the behavioural and the user device information. The file may also comprise other information such as an identifier and a time stamp. It should be understood that the file comprising the above information may then be communicated to the user device.

At the next login, behavioral and user device information may be collected at the user device for that particular login and compared to behavioral and user device information as contained in the file as created at first login in order to ascertain the similarity (e.g., Jaccard similarity, Mahalabonis distance, etc). It should be appreciated that the comparison may occur either locally at the user device or remotely at the authentication server. If the comparison indicates a low similarity then the access is denied or step-up authentication is required. If the comparison indicates a high similarity, and the comparison occurs at the authentication server, then a further comparison with expected information in the database may occur. If the comparison indicates a high similarity, and the comparison occurs local at the user device, then the file and an indication that the similarity is high is forwarded to the authentication server, such that the forwarded file may be compared to expected information at the authentication server (e.g., See FIG. 3). It should be appreciated that the information in the file may be encrypted meaning the authentication server may need to be configured to decrypt the information before performing the comparison. It should be noted that one reason for the further comparison at the authentication server may be that the file may comprise the identifier and the time stamp which enables a further authentication step. For example, if the user actually authenticated first subsequent to the interception of a file (e.g., cookie) then the user may have a new file which makes the intercepted file void by virtue of a new identifier and/or a new time stamp in the new file. Hence, even in the unlikely event that the fraudster managed to emulate the behavioural and user device information, the attempt may still fail as the fraudster does not possess the new identifier and the new time stamp.

Advantageously, the method utilizes behavioral and user device information in order to verify that the user and the device are genuine. Because the behavioral biometrics information is tightly connected to the specific user-device interaction, it is highly unlikely that a different user will be able to log-in using the same device in a stolen device scenario. In addition, the device attributes are collected providing an additional protection against using an intercepted file (e.g., cookie) on a different device in a stolen file scenario. This provides a higher level of secure authentication. Further, the method is highly theft resistant as it is unlikely that a cybercriminal will be able to spoof both behavioral biometric features and device attribute features.

Figure 4B:
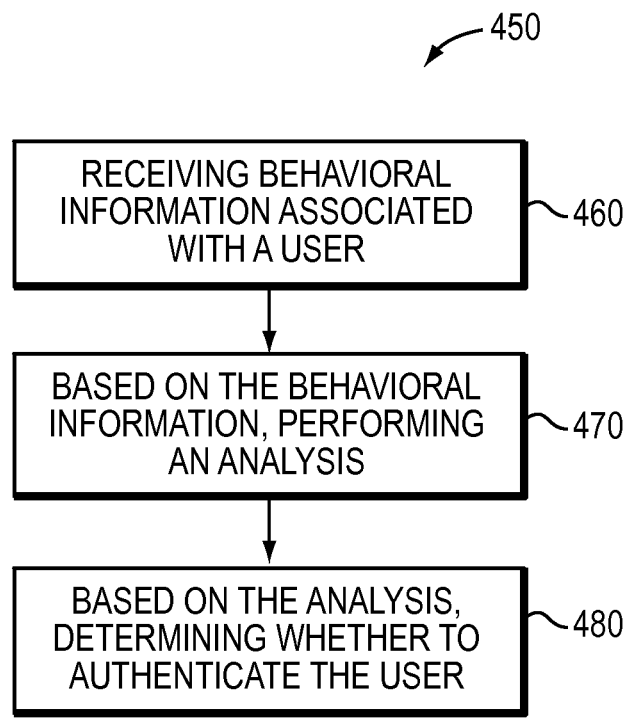
FIG. 4B is a flow chart illustrating a method of carrying out the technique within the electronic environment of FIG. 1.

Referring to FIG. 4B, there is illustrated a flow chart showing another method of carrying out the technique within the electronic environment shown in FIG. 1. In the flow diagram, the operations are summarized in individual blocks. The operations may be performed in hardware, or as processor-executable instructions that may be executed by a processor. Furthermore, the method 450 may, but need not necessarily, be implemented in the environment of FIG. 1.

At step 460, the method comprises receiving behavioural information associated with a user. The behavioural information may comprise user interaction information in connection with user device. For example, the behavioural information or behavioural biometrics may relate to at least one of keystroke time latencies, tapping vibrations, rotations, gesture location, speed, motion, and pressure.

At step 470, the method comprises performing an analysis based on the behavioural information. For example, the method may comprise obtaining expected behavioural information associated with previous transactions. It should be understood that the expected behavioural information may be stored locally on the user device or remotely at the authentication server. The method may in turn analyse the received behavioural information and the obtained expected information.

At step 480, the method comprises determining whether to authenticate the user based on the analysis. It should be understood that determining whether to authenticate the user may comprise determining a numerical risk score which quantitatively identifies a level of risk. It should also be understood that determining whether to authenticate the user may further comprise comparing the risk score against a threshold in order to ascertain whether to grant or deny access.

In one use embodiment, the behavioural information may be collected at login. The collected information is then forwarded to the authentication server (possibly via resource provider). Upon receiving the information, the authentication server may compare the received information to expected information as contained within the database. If the comparison is high then an appropriate risk score may be determined. If the comparison is low then likewise an appropriate risk score may be determined. The risk score may then be compared to a threshold in order to ascertain whether to grant or deny authentication. The comparison with the threshold may occur at either the authentication server or the resource provider.

In another use embodiment, it should be appreciated that behavioural information may be collected during first login. For example, the user behavioral information may be collected in the background at first login to an application or a website. In at least one embodiment, a file (e.g., cookie) may be created comprising the behavioural information.

At the next login, behavioral information may be collected during that particular access, and compared to behavioral information as contained in the file as created at first access in order to ascertain the similarity (e.g., Jaccard similarity, Mahalabonis distance, etc). The comparison may occur either locally or remotely. If similarity is low, authentication may be denied. If similarity is high, authentication may be granted.

Advantageously, if a user device is stolen, access may still be denied as the thief is highly unlikely to be able to emulate user behavioural biometrics. Additionally, the method allows the identification of a specific user where there is a device that is used by several users. Moreover, the method can be used to protect access to information that is stored locally on the device. Furthermore, the method can be used to enhance a secured access to a remote service as well.

Figure 5:
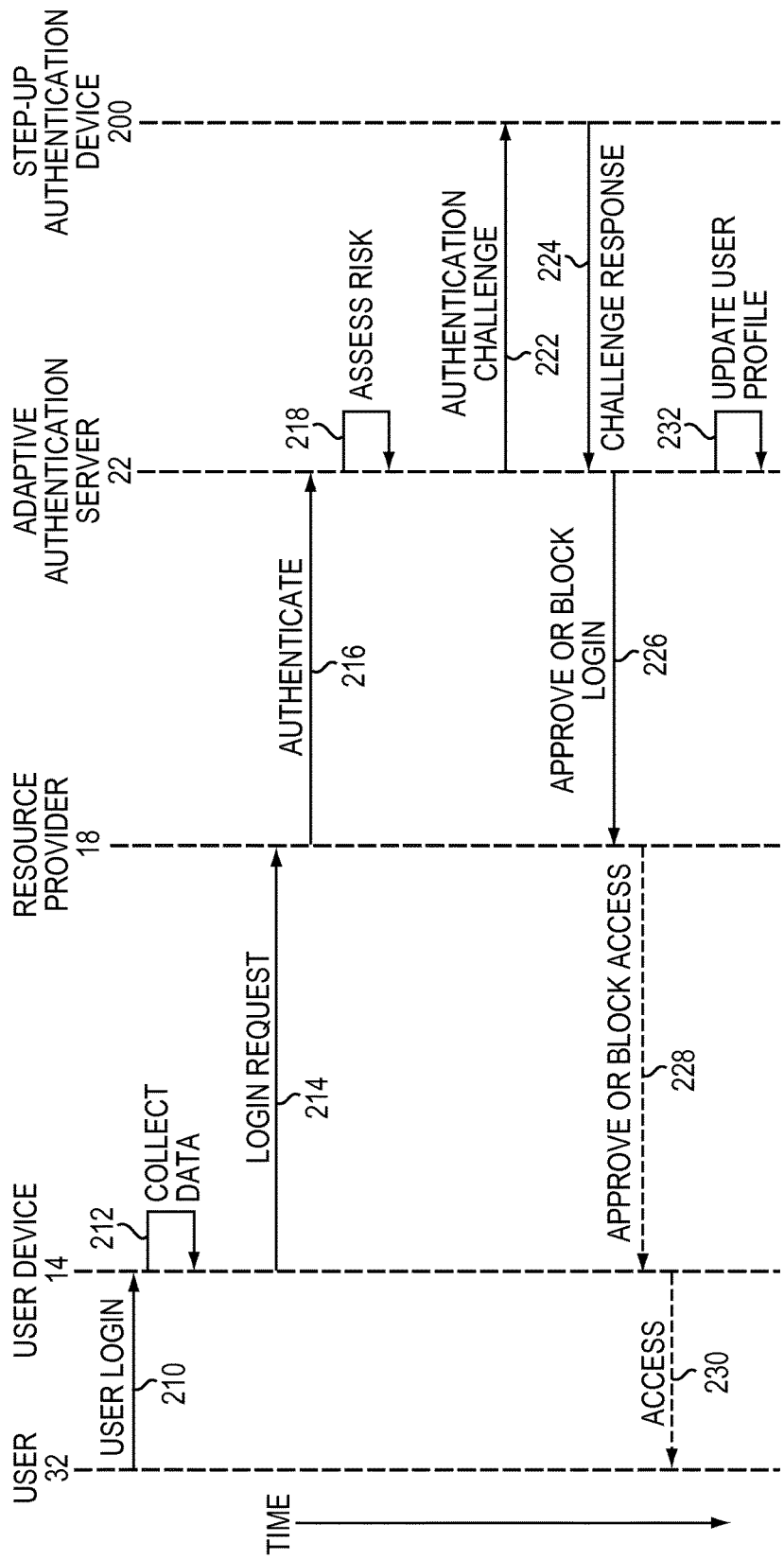
FIG. 5 is a sequence diagram illustrating various communications between components of the environment of FIG. 1 during a user login attempt.

Referring to FIG. 5, there is illustrated an embodiment of how the user 32 can operate the user device 14 in order to obtain access to the computerized resource 19 provided by the resource provider 18. Initially, the user 32 may open a web browser of the user device 14 and navigate the web browser to user login 210 or an authentication page of the resource provider 18. In response to receipt of the authentication web page, the web browser may collect data 212 or a set of adaptive authentication factors. In some arrangements, the authentication web page is coded (e.g., using JavaScript) to collect data which may include device identification data (e.g., a distinctive device ID), user behavioral habits (e.g., typing speeds), etc. In some arrangements, the authentication web page is a null page with the embedded code. In other arrangements, the authentication web page includes dialog boxes to query the user for standard authentication factors such as a username, a password, a PIN, and so on. It should be understood that, when the processor of the user device 14 runs both the web browser application and code of the authentication web page, a specialized circuit is formed which performs specialized operations of particular embodiments of the technique.

Next, the web browser application may provide the collected authentication data including the set of adaptive authentication factors to the resource provider 18. The authentication data may further include the standard authentication factors (e.g., a username and password, etc.) along with adaptive authentication factors. Such information may be bundled (e.g., in accordance with JavaScript obtained with the authentication web page) as a follow-up HTTP message from the user device 14 to the resource provider. This activity is illustrated by the arrow 214.

Upon receipt of the authentication data, the resource provider 18 may relay 216 the authentication data to the adaptive authentication server 22. Accordingly, the adaptive authentication server 22 now has adaptive authentication factors available as input to an adaptive authentication operation.

Next, the authentication server 22 may perform the adaptive authentication operation using the set of adaptive authentication factors as input. Along these lines, the server 22 analyzes the adaptive authentication factors and determines a risk score. This adaptive authentication activity is illustrated by the arrow 218.

In this embodiment, the authentication server 22 may compare the risk score to a threshold in order to ascertain the risk. If the comparison indicates a risky transaction, the authentication server 22 may also perform a further activity involving sending an out of band challenge to the user (e.g., an SMS message to the user's smart phone). This activity is illustrated by the arrows 222 and 224. Also, as can also be seen by the arrow 226, upon finalizing a result, the authentication server 22 provides to the resource provider 18 an indication of whether the risk score exceeds or is less than the threshold.

It should be appreciated that in some arrangements the authentication server 22 may provide the risk score itself to the resource provider 18 so that the resource provider can compare the risk score to the threshold.

In any event, the risk score provided to the resource provider 18 means that authentication is either approved or blocked. This activity is illustrated by the arrow 228. If authentication is successful then access is granted to the computerized resource 19. This activity is illustrated by the arrow 230.

Further, it should be understood that adaptive authentication server 22 may update its records in the database 64 with data gathered during the user login attempt (arrow 232).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method, comprising:
   receiving an electronic authentication request seeking access for a user device to a computerized resource, wherein the electronic authentication request comprises a file that includes (i) a user device attribute associated with a previous communication with the computerized resource, (ii) a behavioural biometric attribute associated with a previous communication with the computerized resource, and (iii) a time stamp describing a prior time the file was used to access the computerized resource;
   in response to receiving the electronic authentication request, performing a first authentication operation to compare the respective user device and the behavioural biometric attributes in the file and corresponding user device and behavioural biometric attributes associated with the electronic authentication request, wherein the first authentication operation utilizes one of Jaccard similarity or Mahalabonis distance to perform the comparison of the first authentication operation;
   upon the comparison of the first authentication operation indicating a relationship between the respective user device and the behavioural biometric attributes in the file and the corresponding attributes associated with the electronic authentication request, performing a second authentication operation by comparing (i) the respective user device and the behavioural biometric attributes in the file and expected user device and behavioural biometric attributes derived from one or more previous communications with the computerized resource and (ii) the time stamp in the file and an expected time stamp that describes when the file was last used to access the computerized resource; and
   based on the comparison of the second authentication operation, determining whether to grant the user device access to the computerized resource.

2. The method as claimed in claim 1, wherein the behavioural biometric attribute comprises user interaction information in connection with the user device.

3. The method as claimed in claim 1, wherein the behavioural biometric attribute relates to at least one of keystroke time latencies, tapping vibrations, rotations, gesture location, speed, motion, and pressure.

4. An apparatus, comprising:
   at least one processing device, said at least one processing device comprising a processor coupled to a memory;
   wherein the at least one processing device is configured to:
      receive an electronic authentication request seeking access for a user device to a computerized resource, wherein the electronic authentication request comprises a file that includes (i) a user device attribute associated with a previous communication with the computerized resource, (ii) a behavioural biometric attribute associated with a previous communication with the computerized resource, and (iii) a time stamp describing a prior time the file was used to access the computerized resource;
      in response to receiving the electronic authentication request, perform a first authentication operation to compare the respective user device and the behavioural biometric attributes in the file and corresponding user device and behavioural biometric attributes associated with the electronic authentication request, wherein the first authentication operation utilizes one of Jaccard similarity or Mahalabonis distance to perform the comparison of the first authentication operation;
      upon the comparison of the first authentication operation indicating a relationship between the respective user device and the behavioural biometric attributes in the file and the corresponding attributes associated with the electronic authentication request, perform a second authentication operation by comparing (i) the respective user device and the behavioural biometric attributes in the file and expected user device and behavioural biometric attributes derived from one or more previous communications with the computerized resource and (ii) the time stamp in the file and an expected time stamp that describes when the file was last used to access the computerized resource; and
      based on the comparison of the second authentication operation, determine whether to grant the user device access to the computerized resource.

5. The apparatus as claimed in claim 4, wherein the behavioural biometric attribute comprises user interaction information in connection with the user device.

6. The apparatus as claimed in claim 4, wherein the behavioural biometric attribute relates to at least one of keystroke time latencies, tapping vibrations, rotations, gesture location, speed, motion, and pressure.

7. A computer program product having a non-transitory computer-readable medium storing instructions, the instructions, when carried out by one or more processors, causing the one or more processors to perform a method of:
- receiving an electronic authentication request seeking access for a user device to a computerized resource, wherein the electronic authentication request comprises a file that includes (i) a user device attribute associated with a previous communication with the computerized resource, (ii) a behavioural biometric attribute associated with a previous communication with the computerized resource, and (iii) a time stamp describing a prior time the file was used to access the computerized resource;
- in response to receiving the electronic authentication request, performing a first authentication operation to compare the respective user device and the behavioural biometric attributes in the file and corresponding user device and behavioural biometric attributes associated with the electronic authentication request, wherein the first authentication operation utilizes one of Jaccard similarity or Mahalabonis distance to perform the comparison of the first authentication operation;
- upon the comparison of the first authentication operation indicating a relationship between the respective user device and the behavioural biometric attributes in the file and the corresponding attributes associated with the electronic authentication request, performing a second authentication operation by comparing (i) the respective user device and the behavioural biometric attributes in the file and expected user device and behavioural biometric attributes derived from one or more previous communications with the computerized resource and (ii) the time stamp in the file and an expected time stamp that describes when the file was last used to access the computerized resource; and
- based on the comparison of the second authentication operation, determining whether to grant the user device access to the computerized resource.

8. The computer program product as claimed in claim 7, wherein the behavioural biometric attribute comprises user interaction information in connection with the user device.

9. The computer program product as claimed in claim 7, wherein the behavioural biometric attribute relates to at least one of keystroke time latencies, tapping vibrations, rotations, gesture location, speed, motion, and pressure.

\* \* \* \* \*